(No Model.) 2 Sheets—Sheet 1.

H. A. SAGER.
PORTABLE SAWMILL.

No. 566,624. Patented Aug. 25, 1896.

WITNESSES:
L. N. Legendre
Geo. Hosted

INVENTOR
H. A. Sager
BY
[signature]
ATTORNEYS.

(No Model.) 2 Sheets—Sheet 2.

H. A. SAGER.
PORTABLE SAWMILL.

No. 566,624. Patented Aug. 25, 1896.

WITNESSES:

INVENTOR
H. A. Sager
BY
ATTORNEYS.

UNITED STATES PATENT OFFICE.

HARRY A. SAGER, OF BUTTE, MONTANA.

PORTABLE SAWMILL.

SPECIFICATION forming part of Letters Patent No. 566,624, dated August 25, 1896.

Application filed May 14, 1896. Serial No. 591,572. (No model.)

*To all whom it may concern:*

Be it known that I, HARRY A. SAGER, of Butte, in the county of Silver Bow and State of Montana, have invented a new and Improved Portable Sawmill, of which the following is a full, clear, and exact description.

The object of the invention is to provide a new and improved portable sawmill which is simple and durable in construction, very effective in operation, and arranged to permit of conveniently moving the mill from place to place in timber regions to saw logs into lumber, railway-ties, or any other articles on the spot where the trees are felled.

The invention consists of certain parts and details and combinations of the same, as will be fully described hereinafter, and then pointed out in the claims.

Reference is to be had to the accompanying drawings, forming a part of this specification, in which similar characters of reference indicate corresponding parts in all the views.

Figure 1:
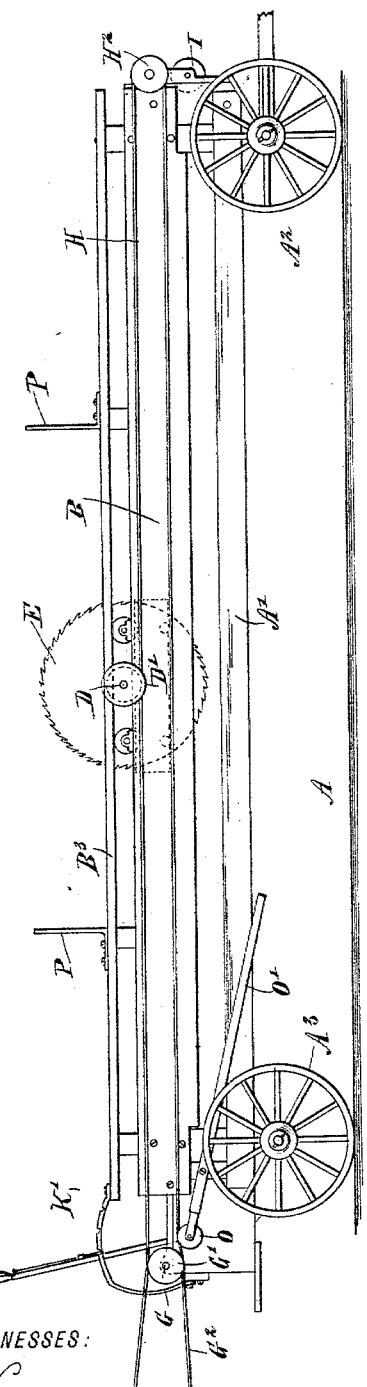
Figure 2:
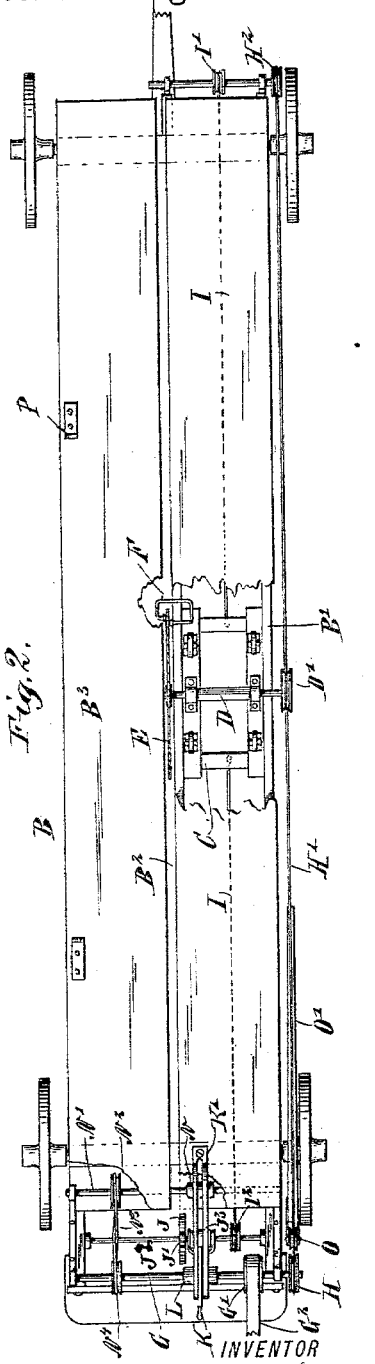
Figure 3:
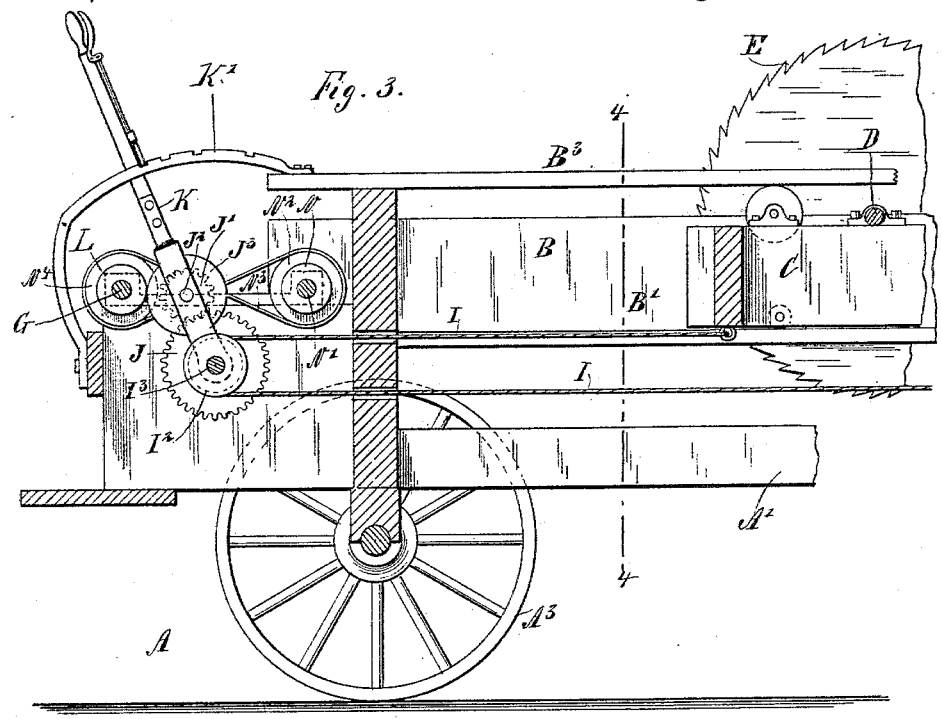
Figure 4:
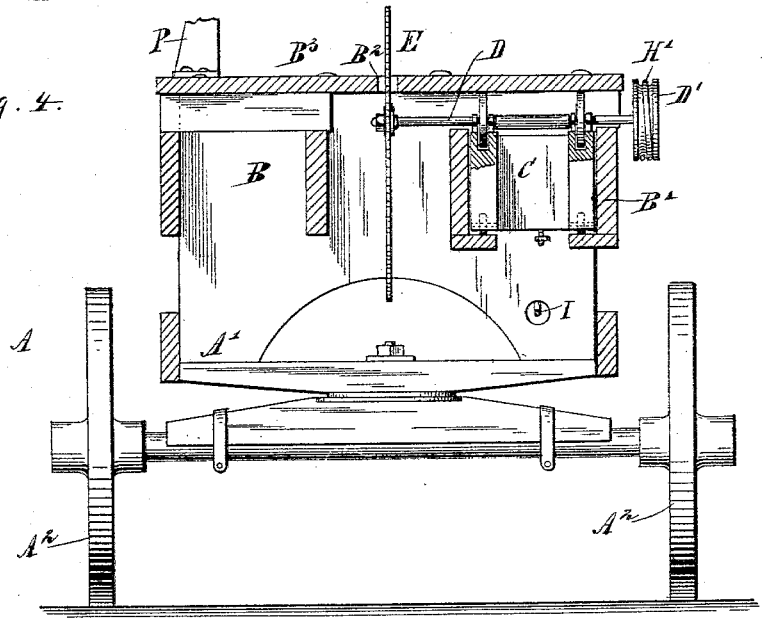

Figure 1 is a side elevation of the improvement. Fig. 2 is a plan view of the same with parts broken out. Fig. 3 is an enlarged sectional side elevation of one end of the improvement, and Fig. 4 is a transverse section of the same on the line 4 4 of Fig. 3.

The wagon A is provided with a suitable body A' and with the front wheels A² and the rear wheels A³, as plainly shown in the drawings, to permit of moving the wagon about from place to place.

On the wagon-body A' is rigidly secured a sawmill-bed B' provided with longitudinal guideways B', in which is fitted to travel a carriage C, moved forward and backward in said guideway by means hereinafter more fully described. In the carriage C is journaled the saw-arbor D, on the inner end of which is secured the circular saw E, extending through a longitudinal slot B², formed in in the table B³, forming part of the sawmill-bed B. A guide F is held on the carriage C to engage opposite faces of the saw and force the latter to run true.

The log to be sawed into lumber is held on the table B³ so that the circular saw E, when rotating, enters the log to cut the latter into the desired lumber during the forward travel of the carriage C. A rotary motion is given to the circular saw E and a forward-and-backward-traveling motion is given to the carriage C from a main driving-shaft G, journaled at the rear end of the body A' of the wagon, as plainly shown in the drawings.

On the shaft G is secured a pulley G', over which passes a belt G², connected with suitable machinery for imparting a rotary motion to the said shaft G. On one end of the latter is secured a grooved pulley H, over which passes a rope belt H', extending longitudinally on one side of the bed B to pass over a second grooved pulley H², journaled on the forward end of the bed B. One of the runs of the belt H' also passes once around the pulley D', secured on the outer end of the saw-arbor D, so that when a rotary motion is given to the shaft G this motion is transmitted by the belt H' to the arbor D, and consequently the circular saw E is rotated to cut the timber.

In order to impart a forward-and-backward-traveling motion to the carriage C, I provide a rope I, secured at its ends to the ends of the carriage C, as plainly shown in Fig. 2, the rope extending from the forward end of the carriage to and over a pulley I', journaled on the front end of the bed B. The rope I then runs rearwardly to and over a pulley I², to then extend to the rear end of the carriage C, on which this end of the rope is fastened. The pulley I² above mentioned is secured on a shaft I³, journaled in suitable bearings on the rear end of the wagon A, and in order to rotate this shaft I³ in either a forward or a backward direction to insure a forward or backward traveling of the carriage by the action of the said rope I the following device is provided: On the shaft I³ is secured a gear-wheel J, in mesh with a pinion J', secured on a shaft J², extending transversely and journaled in a hand-lever K, fulcrumed loosely on the shaft I³. On the shaft J² is secured a friction-pulley J³, adapted to engage either of the friction-pulleys L or N, according to the position of the hand-lever K. The friction-pulley L is secured on the shaft G, and the other friction-pulley N is attached to a transverse shaft N', mounted to rotate in suitable bearings on the rear end of the machine, as plainly indicated in Figs. 2 and 3. On the shaft N' is secured a pulley N², connected by a cross-belt N³ with a pulley N⁴, secured on the shaft G, so that the rotary motion of the shaft G is transmitted by said pulleys N⁴ and N² and the cross-belt N³ to the shaft N', which thus rotates in an opposite direction to that of the shaft G. Now it will be seen that when the friction-pulley J³ is in contact with the friction-pulley L it is rotated in one direction, and consequently a forward traveling motion is given to the carriage C. When, however, the operator swings the hand-lever K forward to move the friction-pulley J³ in contact with the friction-pulley N, then a rotary motion is given to the said pulley J³ in an opposite direction, and consequently the carriage C is caused to travel backward in its bearings B'.

The hand-lever K is guided on and adapted to be locked by a hand-lever to a suitable toothed segment K', as indicated in the drawings. In order to tighten the belt H' to insure a proper transmission of the rotary motion from the shaft G to the arbor D, I provide a tightening-pulley O, secured on one end of a lever O', fulcrumed on the wagon A. Suitable head-blocks P may be employed on the table B³ to securely hold the log in place during the time the saw cuts the log into boards or other lumber.

Having thus described my invention, I claim as new and desire to secure by Letters Patent—

1. The combination with a frame of a carriage longitudinally movable along the frame, an arbor mounted on the carriage, a saw fixed to the arbor, a flexible connection attached to the carriage, a pulley over which said connection passes, a gear having fixed connection with the pulley, a lever the fulcrum of which is concentric with the axis of the said pulley, a gear carried by the lever and meshing with the first gear, a friction-disk in fixed connection with the gear of the lever, two additional friction-disks with which the first friction-disk may alternately engage and means for oppositely driving said additional friction-disks, substantially as described.

2. The combination with a frame of a carriage longitudinally movable on the frame, an arbor supported on the carriage, a saw fixed to the arbor, a pulley fixed to the arbor, a belt passing around the pulley, a drive-shaft for the belt, a flexible connection attached to the carriage a pulley over which the flexible connection passes, a gear having fixed connection with the latter pulley, a lever, the fulcrum of which is concentric with the axis of the said latter pulley, a gear carried by the lever and meshing with the gear in connection with the latter pulley, a friction-disk carried by the lever and in connection with the gear thereof, two additional friction-disks with which the first-named friction-disk may alternately engage, and means for oppositely driving the said additional friction-disks, substantially as described.

3. The combination with a frame, of a flexible connection, a carriage attached thereto a pulley around which the connection passes, a gear-wheel in connection with the pulley, a lever the fulcrum of which is concentric with the axis of the gear-wheel, a gear carried by the lever and movable with the lever around the periphery of the first gear, a friction-disk carried by the lever and in connection with the gear of the lever, a drive-shaft, a pulley fixed to the drive-shaft, a counter-shaft, a pulley fixed to the counter-shaft, a crossed belt connecting the pulleys, a friction-disk carried by the drive-shaft, and a second friction-disk carried by the counter-shaft, the friction-disk of the lever being capable of alternately engaging the remaining friction-disks, substantially as described.

HARRY A. SAGER.

Witnesses:
ANTNY YESKI,
ROBERT EILENBERGER.